US012803923B2

(12) United States Patent
Biradar

(10) Patent No.: US 12,803,923 B2
(45) Date of Patent: Nov. 17, 2026

(54) SCALABLE IP FRAGMENTATION USING PACKET REPLICATION

(71) Applicant: Advanced Micro Devices, Inc., Santa Clara, CA (US)

(72) Inventor: Rajshekhar Biradar, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 70 days.

(21) Appl. No.: 18/620,838

(22) Filed: Mar. 28, 2024

(65) Prior Publication Data

US 2025/0080471 A1 Mar. 6, 2025

(30) Foreign Application Priority Data

Sep. 1, 2023 (IN) ............................ 202311058856

(51) Int. Cl.
*H04L 47/36* (2022.01)

(52) U.S. Cl.
CPC .................................... *H04L 47/36* (2013.01)

(58) Field of Classification Search
CPC .............................. H04L 47/36; H04L 47/365
See application file for complete search history.

(56) References Cited

U.S. PATENT DOCUMENTS 10,261,708 B1 * 4/2019 Ippatapu ................ G06F 3/067
11,916,781 B2 * 2/2024 Kundu ................ G06F 13/1642
2005/0281287 A1 * 12/2005 Niinomi .................. H04L 49/90 370/474
2007/0223472 A1 * 9/2007 Tachibana ............... H04L 47/36 370/473
2015/0019748 A1 * 1/2015 Gross, IV ............... H04L 47/36 709/230
2015/0124622 A1 * 5/2015 Kovvali .................. H04L 45/38 370/236
2015/0341278 A1 * 11/2015 Sundar .................. H04L 47/365 370/392
2016/0234101 A1 * 8/2016 Sundar .................. H04W 28/20
2020/0177516 A1 * 6/2020 Thorstensen ......... H04L 47/365
2023/0065679 A1 * 3/2023 Choukir ................ H04L 45/741
2023/0300063 A1 * 9/2023 Naeimi ................... H04L 45/16 370/390
2023/0327988 A1 * 10/2023 Rennie .................... H04L 45/66 370/392
2024/0396850 A1 * 11/2024 Yoshinaga .......... H04L 49/9042
2025/0267097 A1 * 8/2025 Ignatchenko ........... H04L 47/32

* cited by examiner

*Primary Examiner* — Benjamin M Thieu
(74) *Attorney, Agent, or Firm* — Patterson + Sheridan, LLP

(57) ABSTRACT

Embodiments herein describe creating multiple packet fragments from a large packet that, for example, exceeds a maximum transmission unit (MTU) supported by a network. In one embodiment, a network interface card or controller (NIC) replicates the large packet to form multiple copies (i.e., replicated packets). The number of replications can correspond to the number of fragments needed so the MTU is not exceeded. In one embodiment, the NIC assigns an identifier, such as an ID or a count value, to each replicated packet. The NIC can use the identifier to selectively remove portions of the payloads of the replicated packets (i.e., shrink the packets) so that the combined payloads (or union) of the packet fragments is the same as the payload in the large packet.

20 Claims, 6 Drawing Sheets

SCALABLE IP FRAGMENTATION USING PACKET REPLICATION

CROSS-REFERENCE TO RELATED APPLICATIONS

This application claims priority to the Indian Provisional Application No. 202311058856 filed Sep. 1, 2023 of which is incorporated herein by reference in its entirety.

TECHNICAL FIELD

Examples of the present disclosure generally relate to a hardware solution for fragmenting an IP packet.

BACKGROUND

IP fragmentation is a process used in the Internet Protocol (IP) to transmit data packets that are larger than the maximum transmission unit (MTU) supported by a network. When a packet is too large to be transmitted across a network in a single piece, IP fragmentation divides the packet into smaller fragments that can be transmitted and reassembled at the destination.

One benefit of IP fragmentation includes allowing communication between networks with different MTU sizes. Networks may have diverse infrastructures, and some networks might have smaller MTU sizes due to various constraints. By fragmenting packets, data can still be transmitted across these networks without requiring network-wide MTU adjustments.

Another benefit of IP fragmentation includes data transfer flexibility enabling the transmission of large packets, such as file transfers or multimedia streams, without the need for packet segmentation on the application layer. This allows applications to send larger chunks of data in a single IP packet, simplifying the data transfer process and potentially reducing the overhead of handling multiple smaller packets.

However, current IP fragmentation techniques typically rely on software, which is slow and requires processor time that could be used to perform other tasks.

SUMMARY

One embodiment described herein is a network interface controller or card (NIC) that includes replicator circuitry configured to replicate a packet to generate a plurality of replicated packets and fragmentation circuitry configured to shrink the plurality of replicated packets to satisfy a MTU size based on unique identifiers assigned to the plurality of replicated packets.

One embodiment described herein is an integrated circuit that includes replicator circuitry configured to replicate an internet protocol (IP) packet to generate a plurality of replicated IP packets and fragmentation circuitry configured to shrink the plurality of replicated IP packets to form packet fragments based on unique identifiers assigned to the plurality of replicated IP packets.

One embodiment described herein is a method that includes replicating, in a NIC, a packet to generate a plurality of replicated packets and shrinking, in the NIC, the plurality of replicated packets to satisfy an MTU size based on unique identifiers assigned to the plurality of replicated packets.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
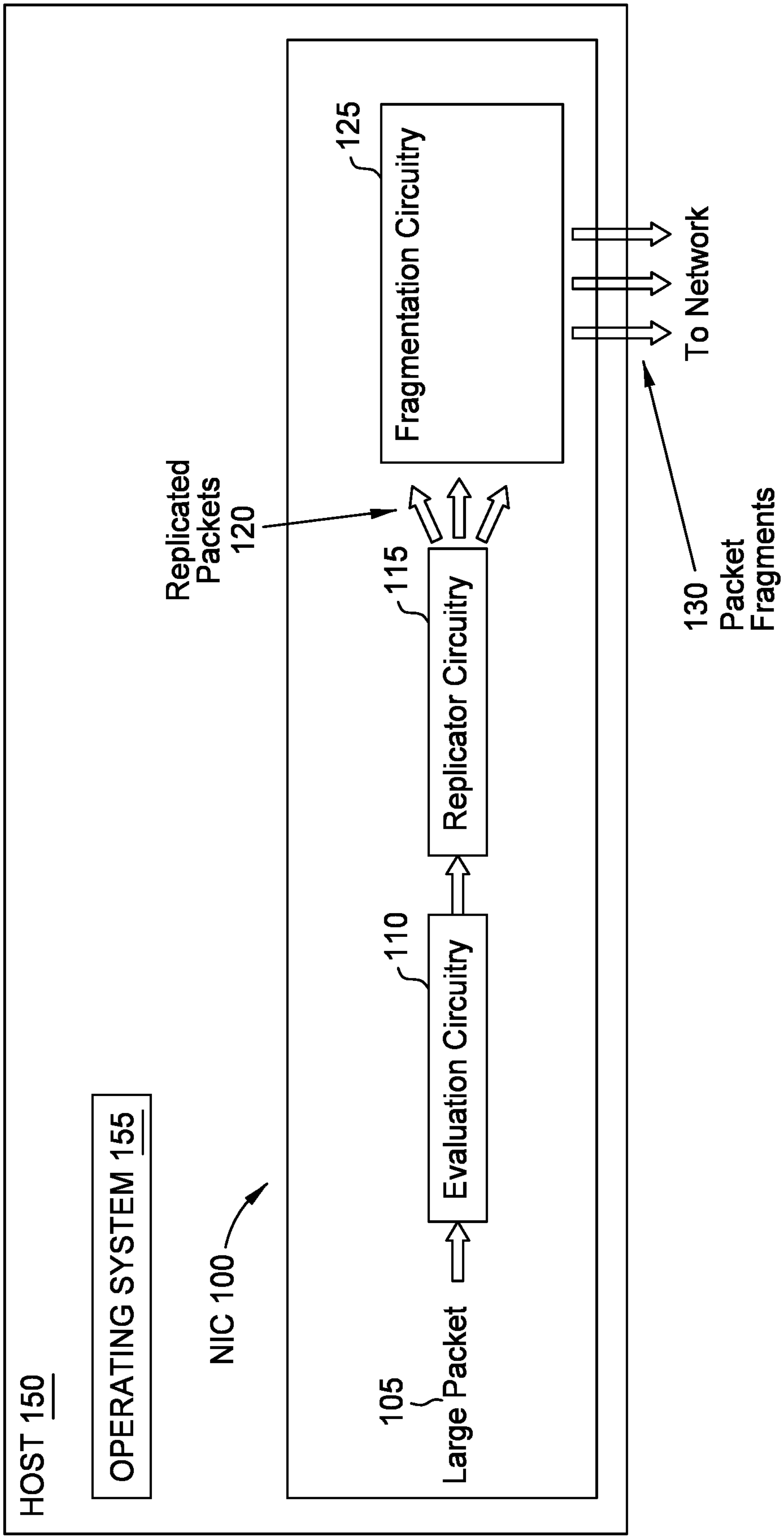
FIG. 1 illustrates a block diagram of a network interface controller or card (NIC) that performs IP fragmentation, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe creating multiple packet fragments from a large packet that, for example, exceeds a MTU supported by a network. In one embodiment, a network interface controller or card (NIC) replicates the large packet to form multiple copies (i.e., replicated packets). The number of replications can correspond to the number of fragments needed so the MTU is not exceeded. For example, if the large packet is 8000 bytes and the MTU is 2000 bytes, the NIC generates four replicated packets.

In one embodiment, the NIC assigns an identifier, such as an ID or a count value, to each replicated packet. For the first replicated packet, the NIC may cut off (i.e., truncate) the last 6000 bytes of the packet to form a first packet fragment of 2000 bytes. For the second replicated packet, the NIC may remove (or omit) 2000 bytes from the beginning of the payload and the last 4000 bytes at the end of the payload to form a second packet fragment of 2000 bytes. For the third replicated packet, the NIC may remove (or omit) 4000 bytes from the beginning of the payload and the last 2000 bytes at the end of the payload to form a third packet fragment of 2000 bytes. For the fourth replicated packet, the NIC may remove (or omit) 6000 bytes from the beginning of the payload but not remove any of the payload at the end of the packet to form a fourth packet fragment of 2000 bytes. In this manner, the combined payloads (or union) of the four packet fragments is the same as the payload in the large packet.

The NIC can then update the headers of the packet fragments and forward them on the network. Advantageously, the embodiments herein can perform IP fragmentation using only hardware elements (e.g., without involving software or a general purpose processor). That is, by assigning identifiers to replicated packets, the hardware in the NIC can track which portions of the payload to remove (e.g., how much to remove/omit at the beginning of the payload and how much to truncate at the end of the packet) in order to create packet fragments that collectively contain the entire payload of the original packet and satisfy the MTU size of the network.

FIG. 1 illustrates a block diagram of a NIC 100 that performs IP fragmentation, according to an example. As shown, the NIC 100 receives a large packet 105. This packet may be created in upstream circuitry in the NIC 100 or by some other computing device or application (e.g., an operating system 155 in the host 150). The host 150 can be a client device, server, and the like. The NIC 100 can be in the same form factor as the host 150, but this is not a requirement.

The large packet 105 is first processed by evaluation circuitry 110 which determines, among other things, whether the packet 105 exceeds the MTU size of the network. If so, the NIC 100 performs IP fragmentation. As discussed above, IP fragmentation is a process used to transmit data packets that are larger than the MTU supported by a network. When a packet is too large to be transmitted across a network in a single piece, IP fragmentation divides the packet into smaller fragments that can be transmitted and reassembled at the destination.

After the evaluation circuitry 110 determines the packet 105 exceeds the MTU size, the circuitry 110 forwards the packet to an input of replicator circuitry 115 which replicates the packet 105. In one embodiment, the replicated packets 120 are exact copies of the large packet 105. That is, each of the replicated packets 120 may have the same header and payload as the large packet 105. As such, the replicated packets 120 also exceed the MTU size of the network. While the replicated packets 120 may be exact copies of the large packets 105, in other embodiments there may be small differences in the replicated packets 120 and the large packet 105 (e.g., they have different identifiers in the intrinsic or hardware headers). However, the discussion that follows will assume that the replicated packets 120 match the received packet 105.

The replicated packets 120 are received at fragmentation circuitry 125 which reduces the payload in the replicated packets 120 such that the resulting packet fragments 130 satisfy the MTU size of the network. Moreover, the fragmentation circuitry 125 can reduce the payload of the replicated packets 120 such that the union of the resulting payloads in the packet fragments 130 is the same as the payload of the large packet 105. Stated differently, the combined payloads in the packet fragments include the same data as contained in the payload of the large packet 105. Thus, no payload data is lost when performing IP fragmentation.

The fragmentation circuitry 125 can also update the headers in the packet fragments 130 so they can be reassembled in the network device that receives the fragments 130. The embodiments herein are not limited to any particular type of algorithm or technique for updating the headers in packet fragments 130. As a non-limiting example, the packets can be processed as described in Request for Comment (RFC) 791 so the fragments can be reassembled at their destination.

In one embodiment, the IP fragmentation illustrated in FIG. 1 is performed in hardware, without using any software or a general purpose processor. For example, the evaluation circuitry 110, replicator circuitry 115, and the fragmentation circuitry 125 can be implemented on an integrated circuit (e.g., an application specific integrated circuit (ASIC)), on multiple integrated circuits, or a P4 based data processing unit).

Figure 2:
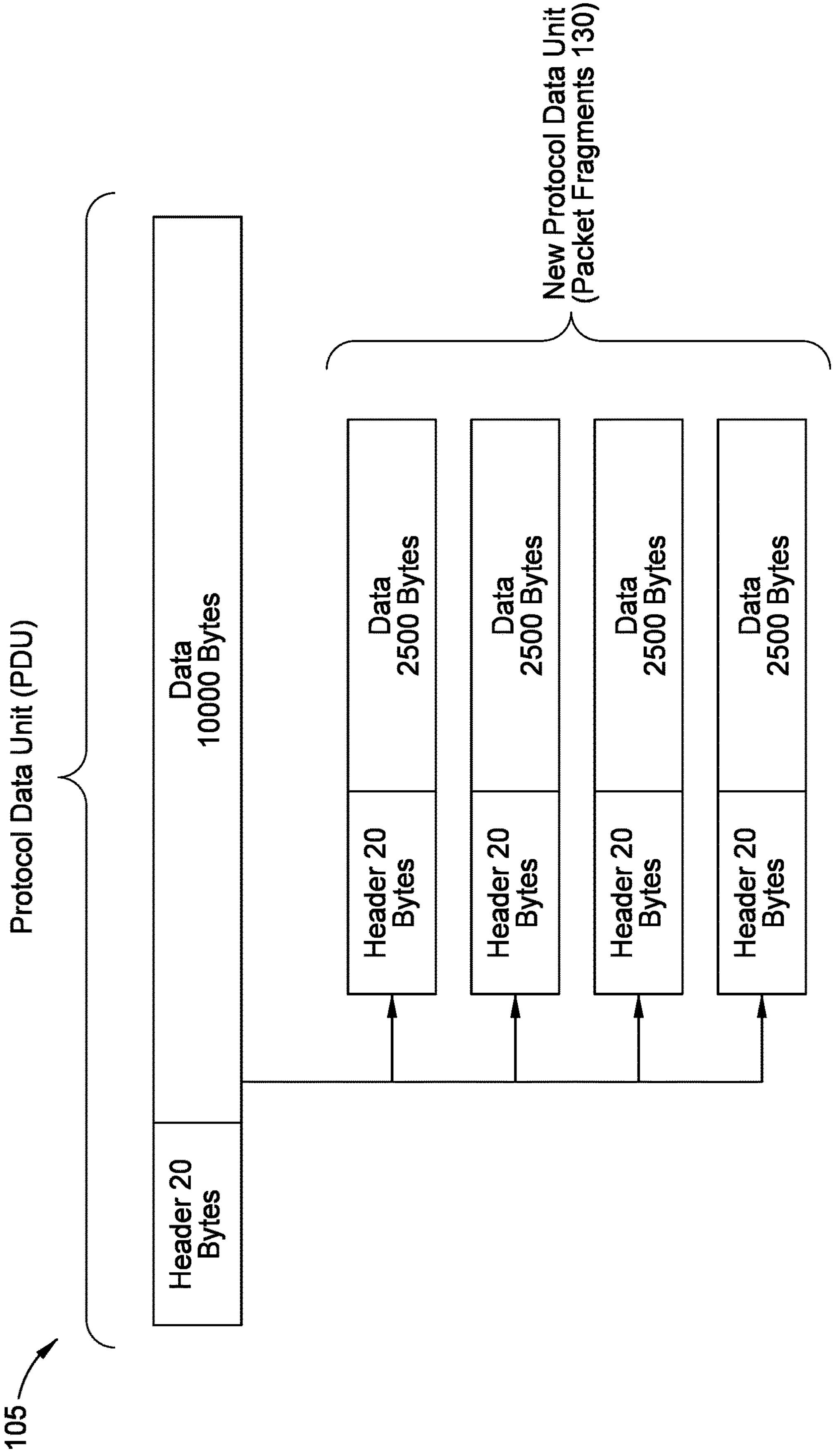
FIG. 2 illustrates IP fragmentation, according to an example.

FIG. 2 illustrates IP fragmentation, according to an example. FIG. 2 illustrates the large packet 105 (e.g., a protocol data unit (PDU)) which has been fragmented using the techniques described herein to create multiple packet fragments 130—e.g., new, smaller PDUs. In this example, the 10,000 byte data payload has been distributed to the four packet fragments 130. That is, each of the packet fragments 130 includes a different 2,500 byte chunk of the 10,000 byte data payload in the large packet 105.

The packet fragments 130 also include respective headers (20 bytes in this example). These headers may be different than the header in the large packet 105. For example, the headers for the packet fragments 130 may be updated to include information so that the network destination can reassemble the payloads in the packet fragments 130 to create the 10,000 byte data payload in the original packet 105. As mentioned above, any suitable technique (e.g., RFC 791) can be used to create and update the headers for the packet fragments 130.

Figure 3:
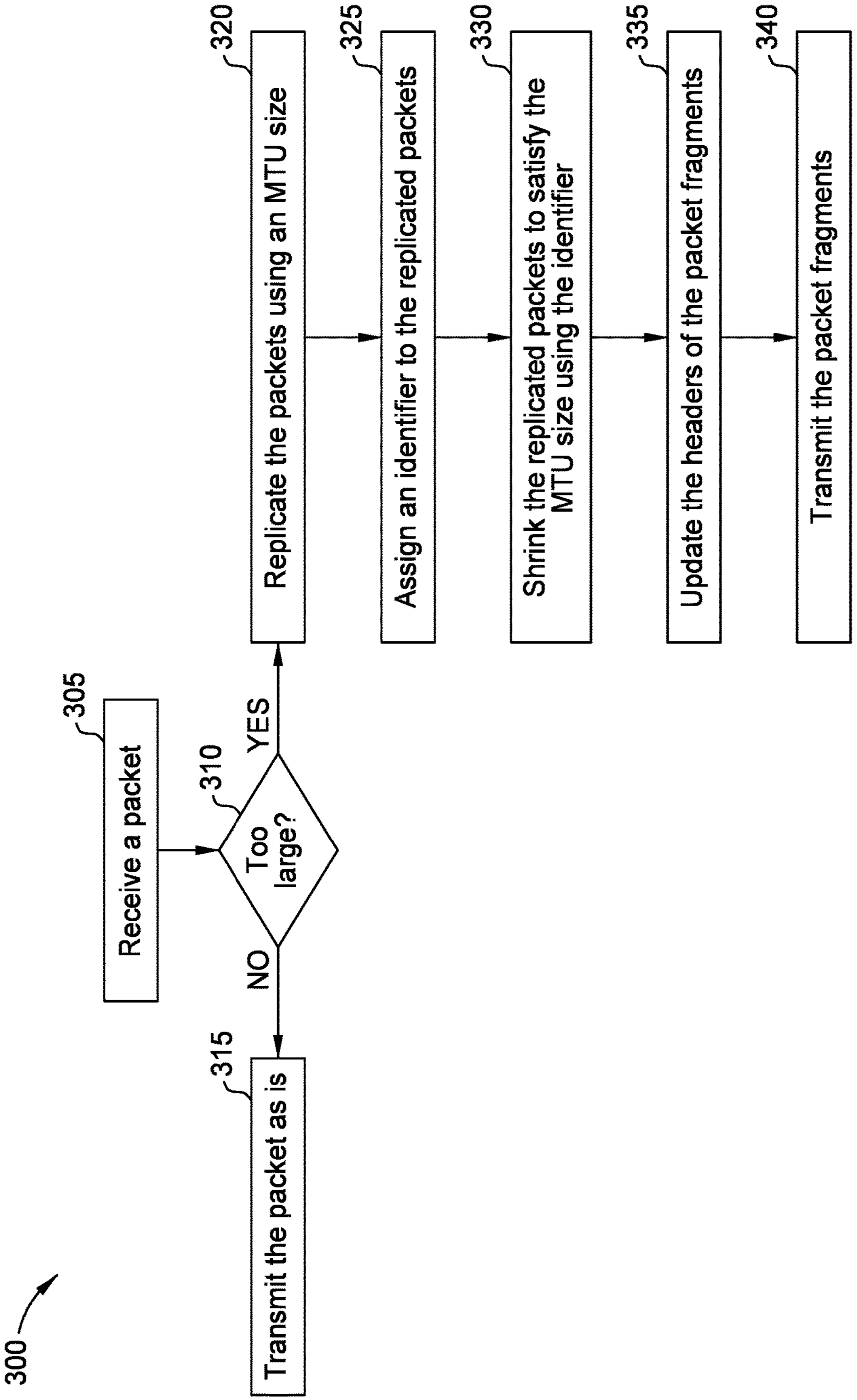
FIG. 3 is a flowchart for performing IP fragmentation, according to an example.

FIG. 3 is a flowchart of method 300 for performing IP fragmentation, according to an example. At block 305, the NIC receives a packet (e.g., a PDU).

At block 310, the NIC determines whether the packet is too large. For example, evaluation circuitry in the NIC may process the packet to determine whether it exceeds the MTU network associated with a destination of the packet. If not, the method 300 proceeds to block 315 where the NIC transmits the packet as is. That is, the NIC does not perform IP fragmentation before forwarding the packet to its destination.

However, if the packet is too large, the method 300 proceeds to block 320 where the NIC replicates the packets using an MTU size. For example, the NIC may replicate the packets so that there are sufficient fragments to carry the payload of the original packet without exceeding the MTU size. In one embodiment, the NIC divides the size of the packet by the MTU size to determine how many replicated packets should be generated. For example, if the packet is 8000 bytes and the MTU is 2000 bytes, the NIC creates four replicated packets. If the packet is 10,000 bytes and the MTU is 2000 bytes, the NIC creates five replicated packets, and so forth.

If the MTU size does not divide evenly into the packet size, the NIC can round up to determine the number of replicated packets. For example, if the packet is 8500 bytes and the MTU is 2000 bytes, the NIC creates five replicated packets. The five replicated packets may have different sizes (e.g., four of the packet fragments are 2000 bytes and one packet fragment is 500 bytes).

In one embodiment, the number of packet fragments is determined by the following pseudo code:

Total fragments ($t$)=Incoming packet payload size ($p$)/MTU payload size ($m$)[Integer division]

If $((m*t)<p)$ then $t=t+1$

Emit payload size ($k=m$) except last fragment whose emit payload size will be $k=p-(m*(t-1))$ In another embodiment, the replicated packets may have the same size—e.g., the five packets could each have a size of 1700 bytes.

At block 325, the NIC assigns an identifier to the replicated packets. The identifier can be any data structure that uniquely identifies one of the replicated packets from the other replicated packets generated at block 320. In one embodiment, the identifier can be an ID assigned to each of the replicated packets. In another embodiment, the identifier could be a count value assigned to each replicated packets. Thus, the embodiments herein at not limited to any particular technique for identifying the replicated packets.

At block 330, the NIC shrinks the replicated packets to satisfy the MTU size using the identifier. In one embodiment, the data removed from each of the replicated packets depends on its corresponding identifier. For example, assume that an 8000 byte packet is being fragmented into four 2000 byte packets. For the first replicated packet, the NIC may cut off (i.e., truncate) the last 6000 bytes of the packet to form a first packet fragment of 2000 bytes. For the second replicated packet, the NIC may remove (or omit) 2000 bytes from the beginning of the payload and the last 4000 bytes at the end of the payload to form a second packet fragment of 2000 bytes. For the third replicated packet, the NIC may remove (or omit) 4000 bytes from the beginning of the payload and the last 2000 bytes at the end of the payload to form a third packet fragment of 2000 bytes. For the fourth replicated packet, the NIC may remove (or omit) 6000 bytes from the beginning of the payload but not remove any of the payload at the end of the packet to form a fourth packet fragment of 2000 bytes. In this manner, the combined payloads (or union) of the four packet fragments are the same as the payload in the large packet.

The identifier provides a way for the hardware in the NIC (e.g., the fragmentation circuitry 125 in FIG. 1) to determine what data to remove from the replicated packet so that the combination or union of the payloads of the packet fragments is the same as the payload in the original packet.

At block 335, the NIC (e.g., the fragmentation circuitry) updates the headers of the packet fragments so that these fragments can be reassembled at their destination. As mentioned above, the embodiments herein are not limited to any particular type of technique or algorithm for updating the headers of packet fragments.

At block 340, the NIC transmits the packet fragments to their common destination. In one embodiment, the packet fragments are separate packets (e.g., PDUs) which can be transmitted independently through the network.

Figure 4:
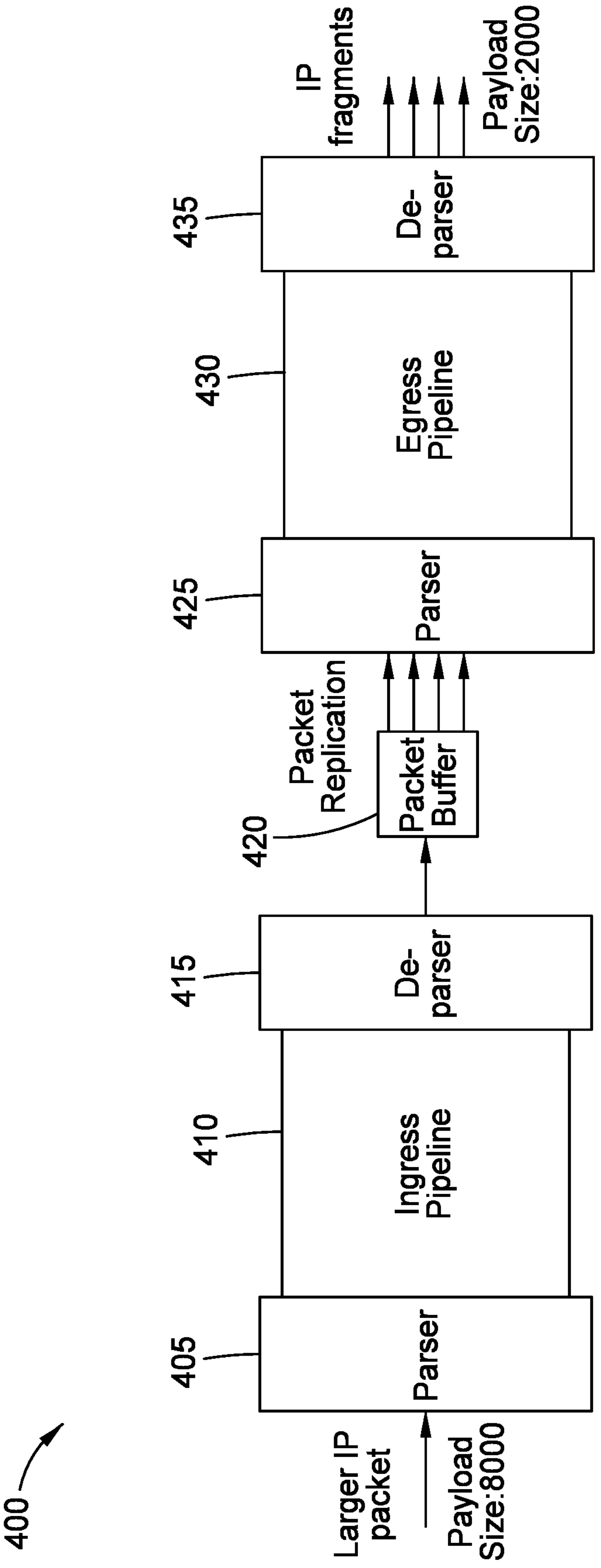
FIG. 4 illustrates a block diagram of a NIC that performs IP fragmentation, according to an example.

FIG. 4 illustrates a block diagram of a NIC 400 that performs IP fragmentation, according to an example. As shown, a first parser 405 receives a large IP packet (with an 8000 byte payload). The parser 405 and an ingress pipeline 410 then process the packet to determine whether IP fragmentation should be performed, but this may be only one of several tasks performed by the parser 405 and the ingress pipeline 410. Put differently, the ingress pipeline 410 may perform other tasks besides triggering packet replication.

Assuming that the ingress pipeline 410 determined that IP fragmentation should be performed, a first de-parser 415 forwards the packet to a packet buffer 420. Thus, the parser 405, the ingress pipeline 410, and the de-parser 415 are one implementation of the evaluation circuitry 110 in FIG. 1. In one embodiment, the parser 405, the ingress pipeline 410, and the de-parser 415 may be part of (or compatible with) the P4 Portable NIC Architecture (PNA). P4 is a domain-specific language for describing how packets are processed by a network data plane. A P4 program comprises an architecture, which describes the structure and capabilities of the pipeline, and a user program, which specifies the functionality of the programmable blocks within that pipeline.

The packet buffer 420 replicates the large IP packet. These replicated packets may be exact copies of the large IP packet. Moreover, the number of replicated packets can depend on the size of the large IP packet and the MTU size of the network. In this example, there are four replicated packets so that the 8000 byte payload in the original payload can be reduced to a 2000 byte payload in four packet fragments.

The packet buffer 420 is one example of the replicator circuitry 115 described in FIG. 1.

A second parser 425 receives the replicated packets from the packet buffer 420. The replicated packets are then processed in an egress pipeline 430 which can reduce the size of the payloads in the replicated packets (so the packets satisfy the MTU size) and update the headers of the packets according to an IP fragmentation algorithm. Moreover, the egress pipeline 430 can perform other functions than the ones described here.

A second de-parser 435 then outputs the IP fragments, which satisfy the MTU size and can be transmitted to the destination on the network. The second parser 425, the egress pipeline 430, and the second de-parser 435 are one implementation of the fragmentation circuitry 125 in FIG. 1. In one embodiment, the second parser 425, the egress pipeline 430, and the second de-parser 435 are part of (or compatible with) the P4 PNA. However, the embodiments herein are not limited to the P4 PNA and can be executed using any hardware that can perform the functions described herein.

In one embodiment, the IP fragmentation illustrated in FIG. 4 is performed in hardware, without using any software or a general purpose processor. For example, the components in FIG. 4 can be implemented on an integrated circuit (e.g., an ASIC) or on multiple integrated circuits.

Figure 5:
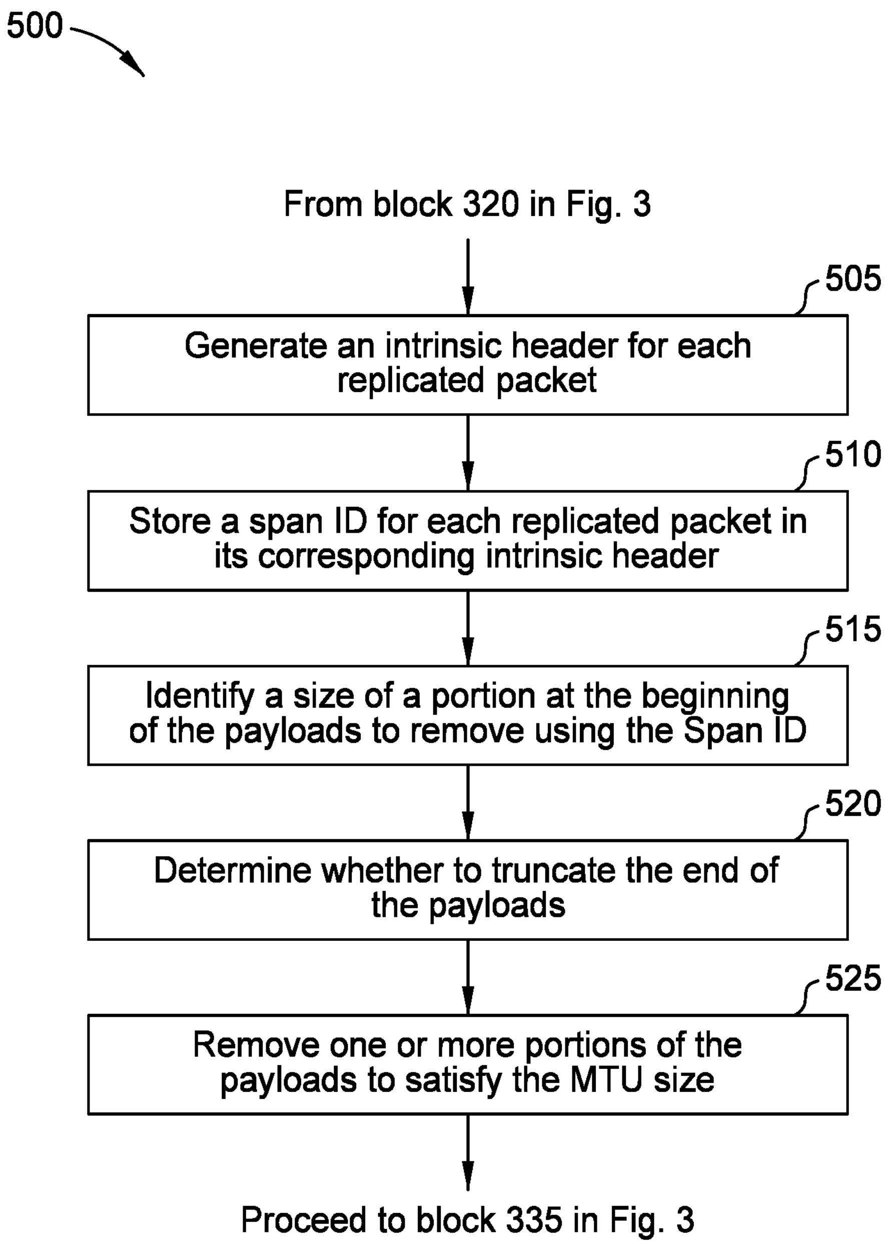
FIG. 5 is a flowchart for performing IP fragmentation, according to an example.

FIG. 5 is a flowchart of a method 500 for performing IP fragmentation, according to an example. The method describes how the techniques discussed above can be performed using the hardware shown in FIG. 4. The method 500 starts after block 320 in FIG. 3 where the NIC (e.g., the packet buffer 420) replicates the packets using an MTU size.

At block 505, the NIC generates an intrinsic header for each replicated packet. The intrinsic header is separate from the IP headers. The intrinsic header can store information that is used by the egress pipeline 430 when processing the replicated packets. The intrinsic headers can be created by the packet buffer 420, the second parser 425, or some other hardware component in the NIC 400. In one embodiment, the intrinsic headers include metadata used by the egress pipeline such as timestamps and basic hardware information.

At block 510, the NIC stores a span ID for each replicated packet in its corresponding intrinsic header. That is, in addition to storing timestamps and other information, the intrinsic headers can store span IDs which uniquely identify the replicated packets from each other.

Figure 6:
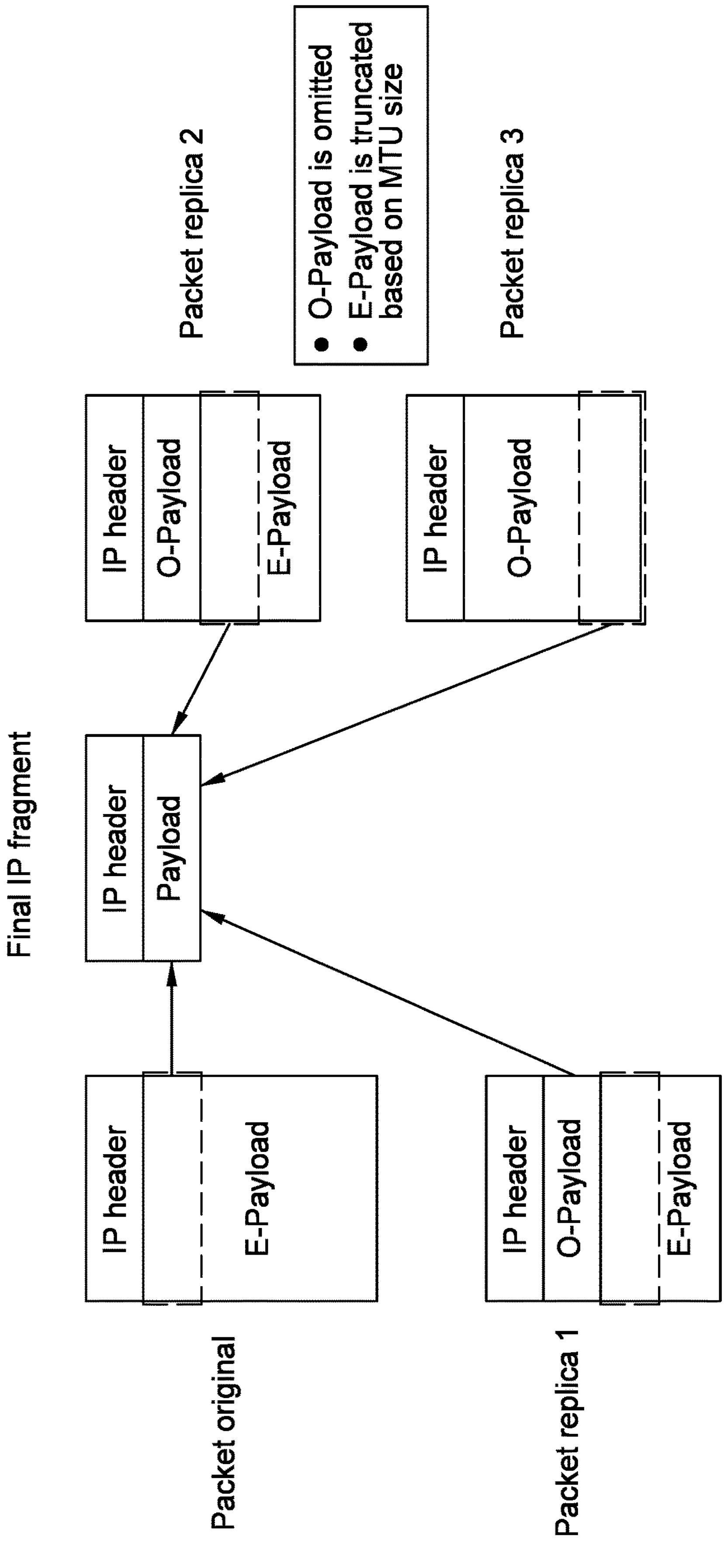
FIG. 6 illustrates removing different sections of replicated packets to form packet fragments, according to an example.

At block 515, the egress pipeline identifies a size of a portion at the beginning of the payloads in the replicated packets to remove using the span IDs. This is illustrated in FIG. 6 where different sections of the replicated packets are removed to form packet fragments. FIG. 6 illustrates the original packet, and three replications of that packet (four packets total). The original packet can be assigned the Span ID 0, the first replica packet is assigned the Span ID 1, the second replica packet is assigned the Span ID 2, and the third replica packet is assigned the Span ID 3.

The egress pipeline can then use the value of the Span ID to determine how much of the data at the beginning of the payload in each packet should be omitted or removed. For the original packet, which has a Span ID 0, none of the payload at the beginning of the packet is removed. For the first replica packet, which has a Span ID 1, 2000 bytes of the payload at the beginning of the packet is removed. For the second replica packet, which has a Span ID 2, 4000 bytes of the payload at the beginning of the packet is removed. For the third replica packet, which has a Span ID 3, 6000 bytes of the payload at the beginning of the packet is removed. This is indicated in FIG. 6 by the "O-Payload" labels.

The amount of data removed from the beginning of the payload can be expressed as fragment_payload_size*i where the fragment_payload_size is the desired payload of the fragment to satisfy the MTU size and i is the value of the Span ID.

Returning to the method 500, at block 520 the egress pipeline determines whether to truncate the end of the payloads. This is also illustrated in FIG. 6 and can be determined based on the MTU size or on the Span ID. In this instance, for the original packet where none of the data at the beginning of the payload is removed, 6000 bytes at the end of the payload should be removed so that the total size of the payload is 2000 bytes. For the first replica packet, 4000 bytes at the end of the payload should be removed. Because 2000 bytes is removed from the beginning of the payload of the first replica packet and 4000 bytes are removed from the end of the packet, the resulting payload is 2000 bytes. For the second replica packet, 2000 bytes of end of the packet should be removed. Because 4000 bytes is removed from the beginning of the payload of the second replica packet and 2000 bytes are removed from the end of the packet, the resulting payload is 2000 bytes. For the third replica packet, none of the data at the end of the payload is removed, thereby resulting in a payload of 2000 bytes since 6000 bytes are removed from the beginning of the payload.

The portion of the payload that is not removed from each of the packets is shown by the dotted box. All the data below this box is truncated or removed. Thus, the resulting packet fragments each have 2000 byte payloads which correspond to different 2000 byte chunks of the original payload. For example, the packet fragment generated from the original packet has the first 2000 byte chunk of the original payload, the packet fragment generated from the first replica packet has the second 2000 byte chunk of the original payload, the packet fragment generated from the second replica packet has the third 2000 byte chunk of the original payload, and the packet fragment generated from the third replica packet has the fourth 2000 byte chunk of the original payload.

At block 525, the egress pipeline removes one or more of the portions of the payloads from the replicated packets to satisfy the MTU size. That is, the egress pipeline can remove portions from the beginning and the end of the payloads as shown in FIG. 6 to result in packet fragments that satisfy the MTU size.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system or method. Accordingly, aspects may take the form of an entirely hardware embodiment that may all generally be referred to herein as a "circuit," "module" or "system."

Aspects of the present disclosure are described below with reference to flowchart illustrations and/or block diagrams of methods, and apparatus (systems) according to embodiments presented in this disclosure. It will be understood that each block of the flowchart illustrations and/or block diagrams, and combinations of blocks in the flowchart illustrations and/or block diagrams, can be implemented by one circuit or multiple circuits.

The flowchart and block diagrams in the Figures illustrate the architecture, functionality, and operation of possible implementations of systems and methods according to various examples of the present invention. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts.

While the foregoing is directed to specific examples, other and further examples may be devised without departing from the basic scope thereof, and the scope thereof is determined by the claims that follow.

What is claimed is:

1. A network interface controller or card (NIC), comprising:

replicator circuitry configured to, after determining a packet exceeds a maximum transmission unit (MTU) size, replicate the packet to generate a plurality of replicated packets each comprising a same payload, wherein each of the plurality of replicated packets exceeds the MTU size; and fragmentation circuitry configured to shrink the plurality of replicated packets to satisfy the MTU size based on unique identifiers assigned to the plurality of replicated packets.

2. The NIC of claim 1, further comprising:

evaluation circuitry connected to an input of the replicator circuitry, the evaluation circuitry configured to determine that the packet exceeds the MTU size.

3. The NIC of claim 2, wherein the evaluation circuitry comprises an ingress pipeline and the fragmentation circuitry comprises an egress pipeline.

4. The NIC of claim 1, wherein shrinking the plurality of replicated packets comprises:

identifying, using the unique identifiers, an amount of data at the beginning of payloads in the plurality of replicated packets to remove; and determining whether to truncate the end of the payloads of the plurality of replicated packets.

5. The NIC of claim 4, wherein each of the plurality of replicated packets has a different amount of data removed at the beginning of its payload and a different amount of data removed at the end of its payload relative to the other replicated packets.

6. The NIC of claim 5, wherein a first one of the plurality of replicated packets has no data removed at the beginning of its payload and a second one of the plurality of replicated packets has no data removed at the end of its payload.

7. The NIC of claim 1, wherein a number of the plurality of replicated packets is based on a size of the packet and the MTU size.

8. An integrated circuit (IC), comprising:

replicator circuitry configured to, after determining an internet protocol (IP) packet exceeds a maximum transmission unit (MTU) size, replicate the IP packet to generate a plurality of replicated IP packets each comprising a same payload, wherein each of the plurality of replicated IP packets exceeds the MTU size; and fragmentation circuitry configured to shrink the plurality of replicated IP packets to form packet fragments based on unique identifiers assigned to the plurality of replicated IP packets.

9. The IC of claim 8, further comprising:

evaluation circuitry connected to an input of the replicator circuitry, the evaluation circuitry configured to determine that the IP packet exceeds the MTU size.

10. The IC of claim 9, wherein the evaluation circuitry comprises an ingress pipeline and the fragmentation circuitry comprises an egress pipeline.

11. The IC of claim 8, wherein shrinking the plurality of replicated IP packets comprises:

identifying, using the unique identifiers, an amount of data at the beginning of payloads in the plurality of replicated IP packets to remove; and determining whether to truncate the end of the payloads of the plurality of replicated IP packets.

12. The IC of claim 11, wherein each of the plurality of replicated IP packets has a different amount of data removed at the beginning of its payload and a different amount of data removed at the end of its payload relative to the other replicated IP packets.

13. The IC of claim 12, wherein a first one of the plurality of replicated IP packets has no data removed at the beginning of its payload and a second one of the plurality of replicated IP packets has no data removed at the end of its payload.

14. The IC of claim 8, wherein a number of the plurality of replicated IP packets is based on a size of the IP packet and the MTU size.

15. A method, comprising:

replicating, in a NIC and after determining a packet exceeds a maximum transmission unit (MTU) size, the packet to generate a plurality of replicated packets each comprising a same payload, wherein each of the plurality of replicated packets exceeds the MTU size; and shrinking, in the NIC, the plurality of replicated packets to satisfy the MTU size based on unique identifiers assigned to the plurality of replicated packets.

16. The method of claim 15, further comprising, before replicating the packet:

determining that the packet exceeds the MTU size.

17. The method of claim 15, wherein shrinking the plurality of replicated packets comprises:

identifying, using the unique identifiers, an amount of data at the beginning of payloads in the plurality of replicated packets to remove; and determining whether to truncate the end of the payloads of the plurality of replicated packets.

18. The method of claim 17, wherein each of the plurality of replicated packets has a different amount of data removed at the beginning of its payload and a different amount of data removed at the end of its payload relative to the other replicated packets.

19. The method of claim 18, wherein a first one of the plurality of replicated packets has no data removed at the beginning of its payload and a second one of the plurality of replicated packets has no data removed at the end of its payload.

20. The method of claim 15, wherein a number of the plurality of replicated packets is based on a size of the packet and the MTU size.

* * * * *